United States Patent [19]
Koepp

[11] Patent Number: 5,370,080
[45] Date of Patent: Dec. 6, 1994

[54] BIRD FEEDER, AUTOMATIC AND TIMED

[76] Inventor: Gregory R. Koepp, 524 W. Lakeshore Dr., Carriere, Miss. 39426

[21] Appl. No.: 116,016

[22] Filed: Sep. 2, 1993

[51] Int. Cl.⁵ .............................................. A01K 5/02
[52] U.S. Cl. .................................................. 119/51.11
[58] Field of Search ............... 119/51.11, 52.3, 57.8, 119/52.1, 56.1

[56]     References Cited
         U.S. PATENT DOCUMENTS

| | | | |
|---|---|---|---|
| 4,628,864 | 12/1986 | Smeltzer | 119/51 R |
| 4,656,969 | 4/1987 | Rapp et al. | 119/51.11 |
| 4,688,520 | 8/1987 | Parks | 119/51.11 |
| 4,722,300 | 2/1988 | Walker et al. | 119/51.11 |
| 4,756,277 | 7/1988 | Peng | 119/51 |
| 4,779,569 | 10/1988 | Lopez | 119/51 |
| 4,782,790 | 11/1988 | Batson | 119/51.11 |
| 4,964,535 | 10/1990 | Curwen | 119/56.1 X |

*Primary Examiner*—Gene Mancene
*Assistant Examiner*—Thomas Price

[57] ABSTRACT

An automatic and timed birdfeeder includes a storage container (20) and valve (22) to dispense stored feed. Dispensing of feed occurs at variable sequences controlled by timer (30). As valve (22) is activated, stored feed flows through dispensing port (26) onto receptacle platform (28) for access by feeding birds. Receptacle platform (28) supports frame (35) by use of spaced supports posts (34). Frame (35) supports container (20) and battery (32). Valve (22) is attached to container (20). Vital exposed components are fabricated of metal to resist damage by vandalous animals. An associated feed filling access cover (21) is supported above container (20), in turn accessed by hinge action of protective body (36). Located in one end of body (36) is control panel (38) which houses programming switch (56), amount switch (58), mode switch (60), main switch (62). Sensor (53) is located above control panel (38), and enables operation during daylight hours only if selected by mode switch (60). Adjustable baffles (29) allow custom feed blending to be provided by the feeder without prior mixing.

8 Claims, 6 Drawing Sheets

BIRD FEEDER, AUTOMATIC AND TIMED

BACKGROUND—FIELD OF THE INVENTION

This invention relates to bird feeders, specifically to such feeders that are timed, and automatic.

BACKGROUND—DESCRIPTION OF PRIOR ART

For many years, stores of various types, including, but not limited to, hardware stores, feed stores, pet stores, specialty shops, discount stores, and mail order centers have offered various types of bird feeders.

To date, many inventors and craftsmen have created and manufactured several types of feeders, bowls, and dishes, and so forth. Many feeders have been constructed in such a manner so as to entice rodents, squirrels, rats, raccoons and other animals or vermin to breach any security of these units by pecking, chewing, or gnawing into them.

Some feeders have been constructed in such a manner as to constitute a gravity fed container with holes, slits, screens, or other openings to allow access to the food supply. This type of feeder allows waste or contamination of the food by birds and animals that may scratch or dig in the readily accessible food.

In addition, one or more birds seeking certain preferred varieties of seed or feed may quickly empty a feeder of this type as they dig or scratch through the supply of food. Many times seeds from these types of feeders have been thrown to the ground, sometimes sprouting, to the dismay, dissatisfaction, or surprise of the feeder owner. Therefore, the refilling activity of such a feeder is determined by the action of such vandalous animals.

This type of feeder is considered to be manually operated, and causes the owner to be at the mercy of the aforementioned conditions or situations, continually checking the feeder to ascertain that it does not run out of feed. This can become a quite tedious chore, but if one is to maintain a populace of feeding birds or animals, then it is imperative that the feeder maintain a continuing supply of food.

Objects and Advantages

Accordingly, besides the objects and advantages or the bird feeders as described above, several objects and advantages of the present invention are:

(a) to provide a feeder that can be produced in a variety of sizes and shapes, and various materials;

(b) to provide a feeder that has a storage container and dispensing port made of metal or some other predator resistant material to reduce the possibility of premature emptying;

(c) to provide a feeder that has automatic, timed operation;

(d) to provide a feeder that can be refilled according to set schedule as determined by the timed dispensing intervals;

(e) to provide a feeder that can operate for extended periods of time without the need of mechanical maintenance;

(f) to provide a feeder that provides more efficient use of the food material by keeping the food fresh, clean, and dry until dispensed;

(g) to provide a feeder that allows the operator to have longer, more controllable periods of time between refills, therefore allowing greater freedom of time;

(h) to provide a feeder that allows food dispensing at pre-selected intervals of time, thereby creating a return of feeding birds at regular intervals, instead of losing birds to another area that may have food available while conventional feeders may be emptied unknowingly;

(i) to provide a feeder that may be configured to dispense food at pre-selected intervals so as to effectively supplement the normal diet and feeding patterns of the birds without their developing a dependence on the feeder for the major portion of their diet, thereby insuring continuous visits to the feeder by birds throughout the day;

(j) to provide a feeder that is aesthetically pleasing, can compliment various habitat or exterior decor, or can be camouflaged or concealed if so desired;

(k) to provide a feeder with internal baffles that may be readily adjusted so as to provide various ratios of feed mixes without prior mixing;

(l) to provide a feeder that can be configured to dispense variable amounts of feed to satisfy use by a given populace of birds, thereby conserving feed, yet maintaining a continual supply of feed;

BRIEF DESCRIPTION OF THE DRAWINGS

The present invention will become more fully understood from the accompanying drawings which are given by way of illustration only and the detailed description given herein below, and thus are not limitative of the present invention, and wherein.

Reference Numerals In Drawings

| | |
|---|---|
| 20 container | 21 container cover |
| 22 valve | 23 auger |
| 24 motor (gearmotor) | 25 bracket |
| 26 outlet | 27 inlet |
| 28 receptacle platform | 29 baffle |
| 30 timer | 32 battery |
| 33 rail | 34 support posts |
| 35 frame | 36 body |
| 37 screw | 38 control panel |
| 39 wiring harness | 40 hinge |
| 41 wiring harness | 44 wiring harness |
| 46 latch | 47 drainage slot |
| 48 handle | 50 support brace |
| 52 catch | 53 sensor |
| 55 control panel cover | 56 programming switch |
| 57 screw | 58 amount switch |
| 60 mode switch | 62 main power switch |
| 64 conduit | 66 strap |
| 68 screw | 70 clamp |
| 72 baffle | 76 baffle |
| 78 nipple | 80 tab |
| 80a tab | 82 tab |
| 82a tab | 86 sleeve |

-continued

| 88 end cap | 90 screw |
|---|---|
| 92 screw | 94 screw |
| 96 mount | 98 support post |
| 100 timer (A) | 102 timer (B) |
| 104 resistor | 106 resistor |
| 108 capacitor | 110 capacitor |
| 112 capacitor | 114 resistor |
| 116 capacitor | 118 capacitor |
| 120 capacitor | 122 diode |
| 124 resistor | 126 resistor |
| 128 transistor | 130 diode |
| 132 diode | 134 capacitor |
| 136 capacitor | 138 capacitor |
| 140 resistor | 142 resistor |
| 144 resistor | 146 resistor |

DESCRIPTION OF THE INVENTION

Figure 1:
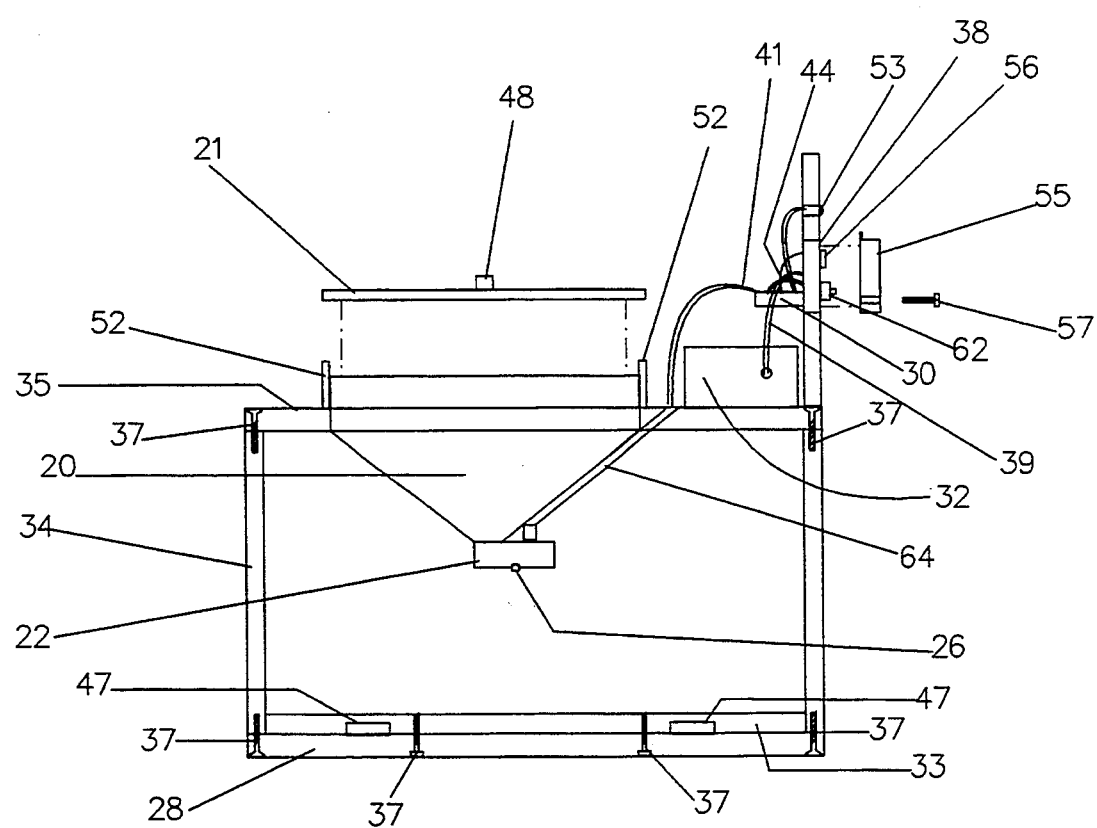
FIG. 1 is an elevational side view of my invention with the main body roof and one end portion removed so as to clearly show the location of various components.
Figure 2:
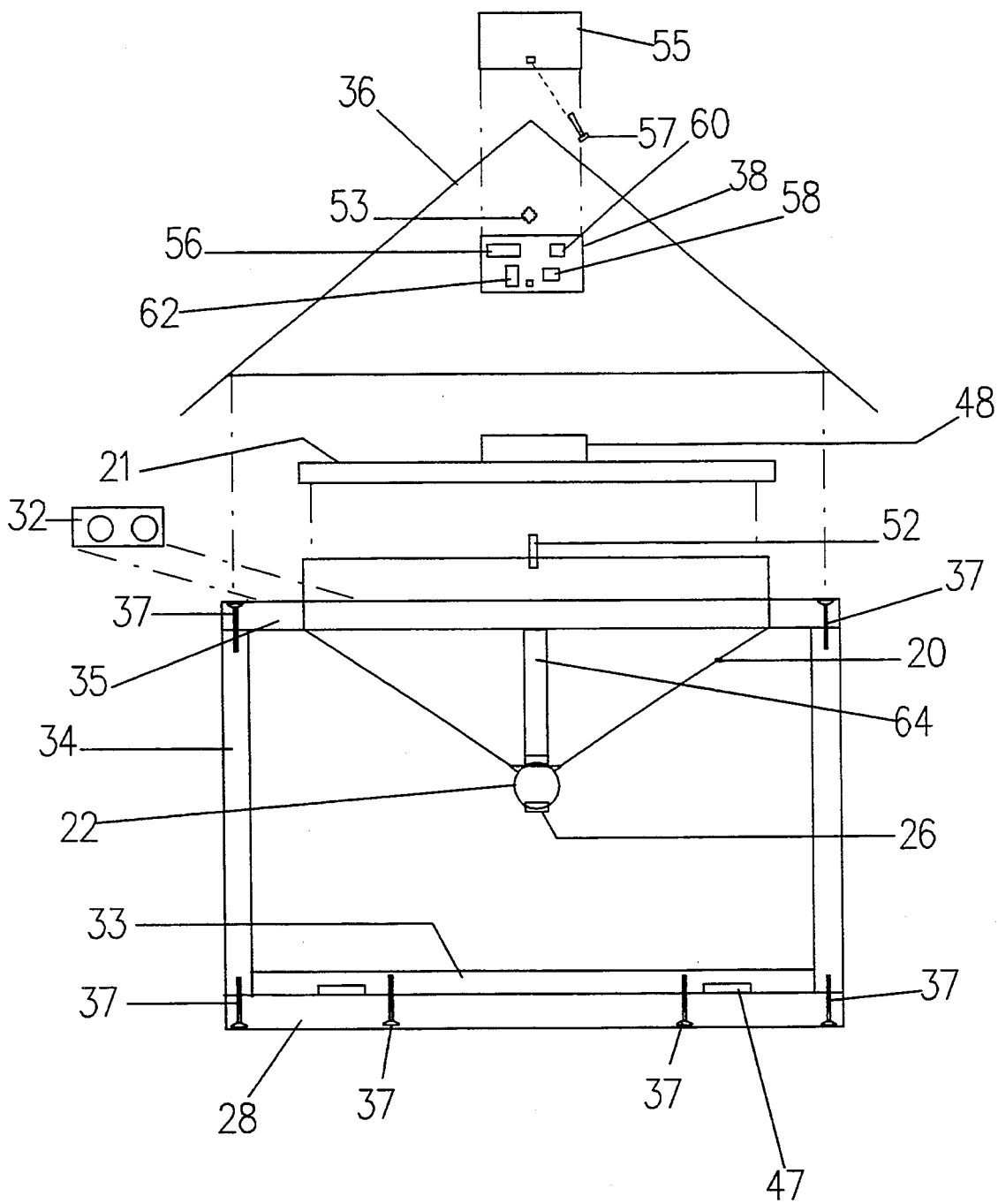
FIG. 2 is an exploded end elevational view of the apparatus.

A typical embodiment of the bird feeder of the present invention is illustrated in FIG. 1 and FIG. 2. The feeder has a receptacle platform 28 of rigid material. Support posts 34 are attached perpendicular to receptacle platform 28 and a frame 35 by use of screws 37. Rails 33 are located at perimeter of platform 28, and contain drainage slots 47. Rails 33 are attached to receptacle platform 28 by use of screws 37. A body 36 is attached to a frame 35 by two hinges 40. Body 36, receptacle platform 28, rail 33, and support posts 34 are preferably made of wood, and frame 35 is preferably made of plywood. Hinge 40 is preferably made of brass.

A container 20 is mounted to support frame 35. Container 20 is an inverted cone shape open at each end. A container cover 21 is mounted to the top of container 20, and is secured in place by a catch 52 on opposite sides of container 20. A handle 48 is used to facilitate lifting of container cover 21. Container 20 and container cover 21 are preferably made of stainless steel sheet metal. A valve 22, having an inlet 27 and an outlet 26 is connected the bottom of container 20.

A control panel 38 is attached to one end of a body 36. A power source 32 is mounted on frame 35. Power source 32 is a conventional battery pack. A timer 30 is mounted to control panel 38. Control panel 38 is connected to power source 32 by a wiring harness 39, and control panel 38 is connected to timer 30 by a wiring harness 44.

Control panel 38 contains a sensor 53, a programming switch 56, an amount switch 58, a mode switch 60 and a main power switch 62. A control panel cover 55 is secured in place over control panel 38 by a screw 57.

Figure 3:
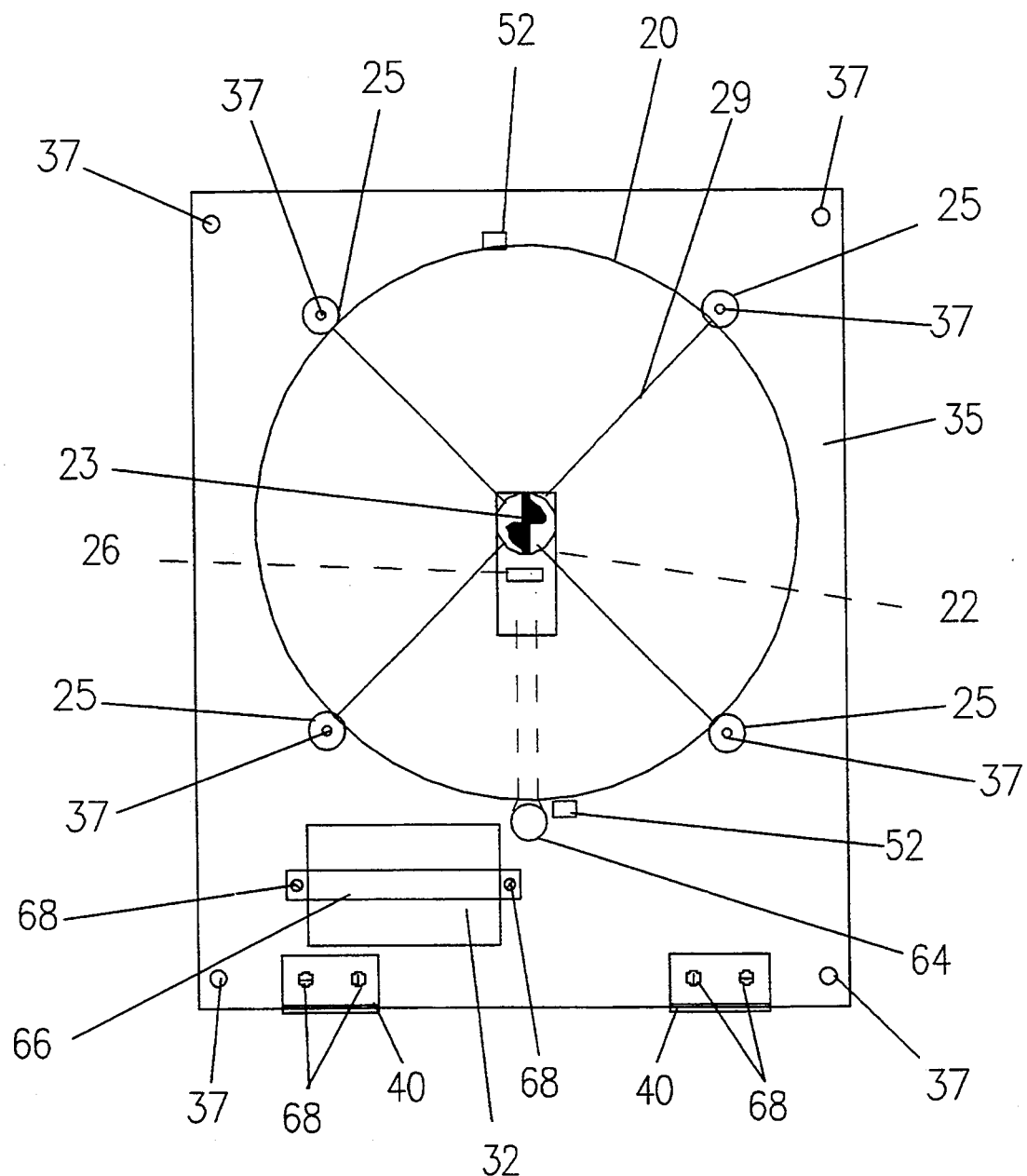
FIG. 3 is a top view of the apparatus of FIG. 1, with the body removed.

FIG. 3 is a view from the top of the feeder apparatus with body 36 removed and container cover 21 removed. Frame 35 supports container 20 and battery 32. Frame 35 is attached to support posts 34 by use of screws 37. Container 20 is mounted to frame 35 by brackets 25 and screws 37. Adjustable baffles 29 fit inside of container 20. A conduit 64 for protection of a wiring harness 41 protrudes through frame 35. Catches 52 are to hold container cover 21 in place. Battery 32 is secured in place by use of a strap 66 and screws 68. Hinges 40 are mounted to the frame 35 by use of screws 37. Hinges 40 are used to connect body 36 to frame 35. A support brace 50 is mounted to frame 35 by use of screws 37. Support brace 50 is used to hold body 36 in the raised position for feed filling or battery 32 maintenance.

Figure 4:
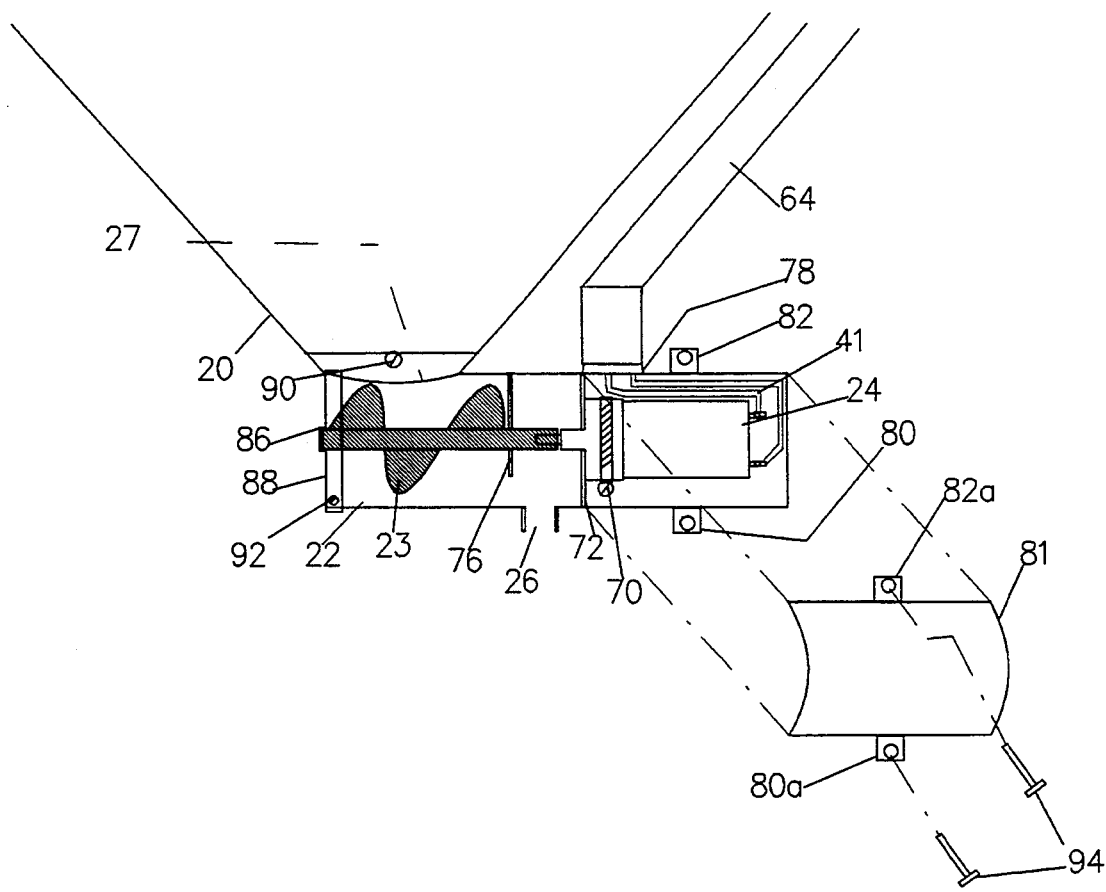
FIG. 4 is an elevational view of the valve of the apparatus of FIG. 1.

FIG. 4 is an elevational view of valve 22 and its associated components. The inlet 27 of valve 22 is attached to container 20 by use of screws 90. An auger 23 is mounted inside of valve 22 and is supported in place a by baffle 76, and a sleeve 86 which is attached to an end cap 88. End cap 88 is secured in place by use of screws 92. A motor 24 is mounted into a baffle 72, and is secured in place by a clamp 70. The output shaft of motor 24 fits into the notched end of auger 23. A conduit 64 is connected to valve 22 by use of a nipple 78. Motor 24 is connected to timer 30 by a wiring harness 41 which is routed through and is protected by conduit 64. A motor cover 81 is secured in place over motor 24 by use of screws 94 placed through tabs 82 and 82a and tabs 80 and 80a. Valve 22 is preferably made of stainless steel. Motor 24 is a gearmotor as marketed by CANON, USA, Lake Success, N.Y., Part # DG16-T14G4B, or similar. Auger 23 is made of stainless steel by Auger Manufacturing Specialists, Frazer, Pa. However, auger 23 can consist of molded plastic, fiberglas, nylon, or any other similar rigid, rust resistant material.

Figure 5:
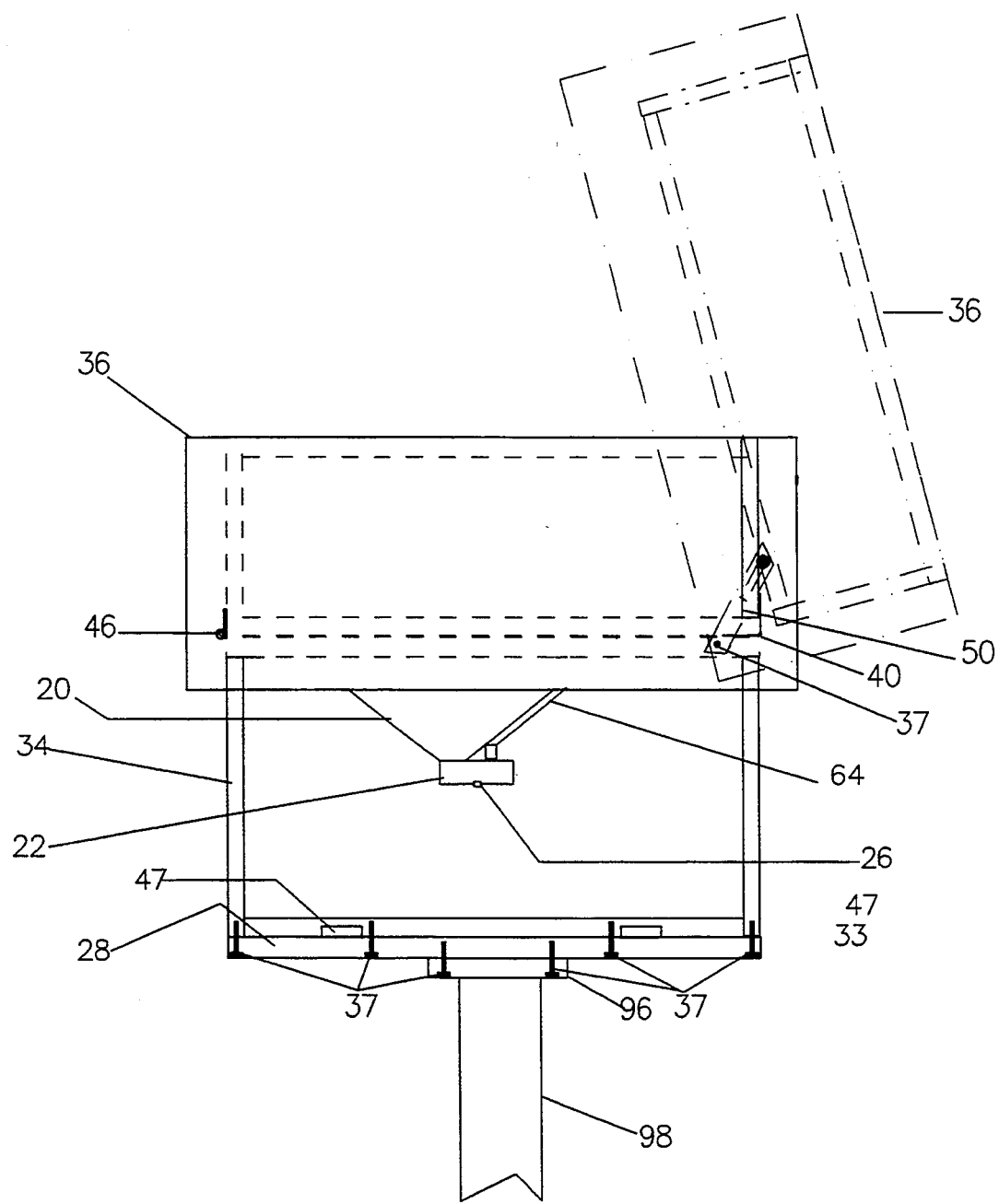
FIG. 5 is an elevational side view of the apparatus, showing the alternate position of the body.

FIG. 5 is an elevational side view of my invention shoving body 36 in its normally closed position, and showing a projected figure of body 36 in the raised or open position for servicing or feed filling. Bracket 50 is attached to frame 35 by screw 37 and is used to hold body 36 in a rigid position while open. A latch 46 secures closed position of body 36. Receptacle platform 28 receives dispensed feed that flows from outlet 26. Rails 33 contain dispensed feed on receptacle platform 28, while allowing water accumulation to flow through drainage slots 47. Rails 33 are attached to receptacle platform 28 by screws 37 and are easily removed for cleaning. A mount 96 is attached to the underside of platform 28 by use of screws 37. Mount 96 is preferably an aluminum base that connects to a support post 98.

Figure 6:
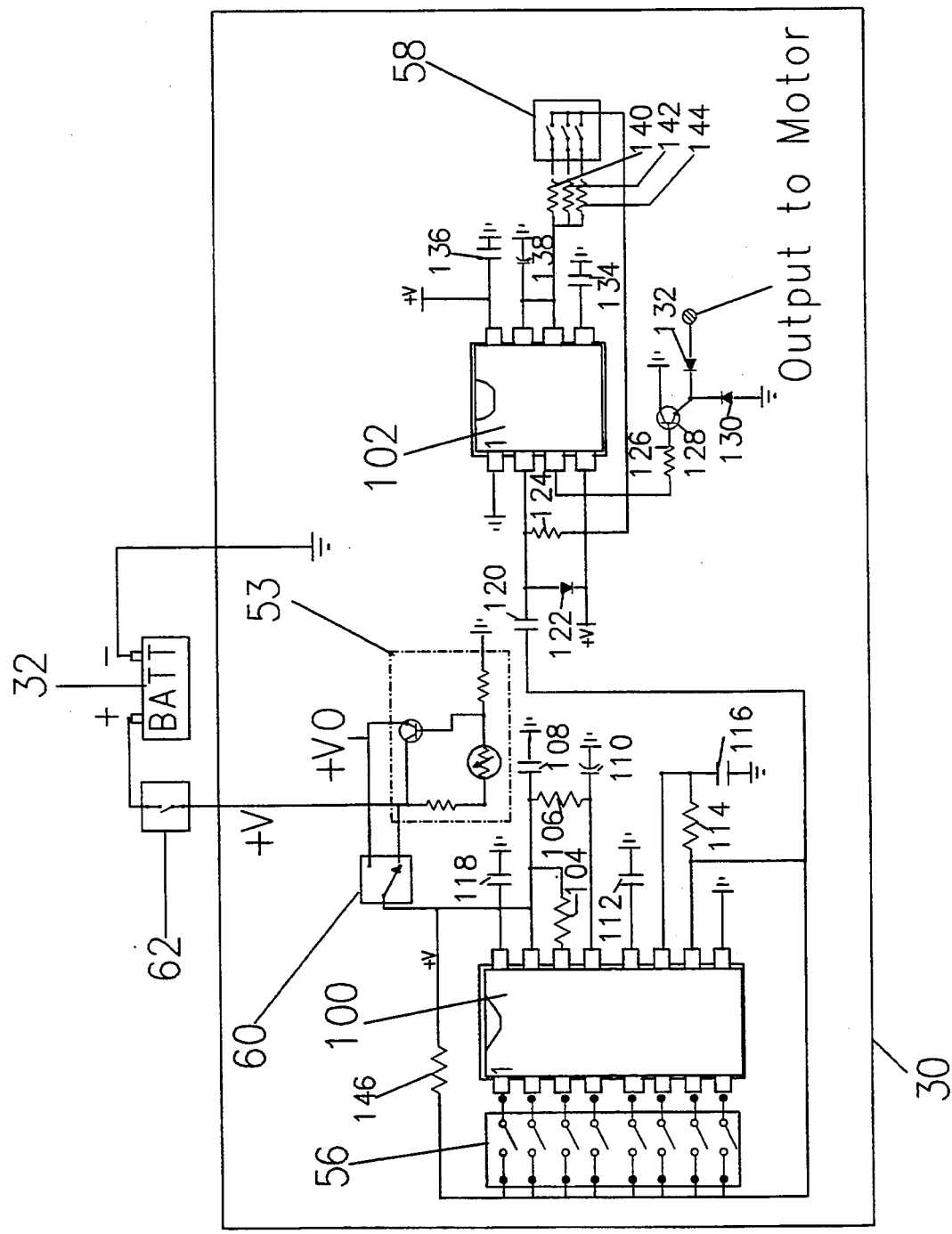
FIG. 6 is a schematic diagram of the timer circuit of the apparatus of FIG. 1.

FIG. 6 is a view of the timer 30 and associated components. A battery 32 supplies stored energy. A main power switch 62 connects battery 32 to the timer 30. A switch 60 selects operation through sensor 53 for daylight only, or bypasses sensor 53 for full-time operation. The time reference base for timer (A) 100 is produced by a network consisting of a resistor 106, a capacitor 110, and a resistor 104. Capacitors 108, 118, and 112 serve as arresting points to abate transient voltages or voltage spikes so as to prevent false triggering of timer (A) 100. A resistor 146 is coupled with a switch 56 to select varying time increments of a trigger pulse to activate timer (B). A resistor 114 and a capacitor 116 form a time delay network to cause timer (A) 100 to be reset and repeat the timing cycle as selected by use of switch 56. A capacitor 120 is used to limit the quantity of triggering signal produced by timer (A) 100. Switch 58 is connected to a capacitor 138, and resistor 124. Switch 58 allows the selection of resistors 144, 142, or 140 to form a network to produce the time increment, or RC, of the output signal from timer (B) 102. The output signal from timer (B) 102 is coupled through a resistor 126 and biases a transistor 128. Transistor 128 TURNS on motor 24, which will operate for the duration of the output signal. Diodes 122, 130, and 132 serve as one way switches and block voltages from unwanted sources. Capacitors 134 and 136 help suppress transient voltages to reduce the possibility of false triggering. Timer (A) 100, and timer (B) 102 are produced by Exar Corporation, 2222 Qume Drive, San Jose, Calif., under part number XR-2240 for timer (A)100, and XR-L555 for timer (B) 102.

Operation of Invention

The manner of using the bird feeder is somewhat similar to that of feeders presently in use. Namely, once the location has been chosen and the bird feeder securely mounted, one first opens the latch 46, lift body 36 until the metal brace 50 stops body 36 from opening further. Remove container cover 21 by opening catches 52. Pour feed into container 20 until full, replace container cover 21, fasten catches 52, connect battery 32, close body 36, secure latch 46.

Remove screw 57 from control panel cover 55. Remove control panel cover 55, set programming switch 56 to desired time increment of operation. Select amount of feed desired to be dispensed with amount switch 58. Select daylight only or full-time operation with mode switch 60. Turn on main switch 62, valve 22 will activate and discharge feed through outlet 26 onto the receptacle platform 28. Replace control panel cover 55, and secure with screw 57. Sensor 53 detects daylight and allows operation of the system, unless overridden by mode switch 60, which may be used to select daylight only or continuous operation.

Summary, Ramifications, and Scope

Accordingly, the reader will see that the bird feeder of this invention is simple and convenient to use. The bird feeder allows a fresh and continuous supply of food to be on hand, without causing the user to repeatedly check the quantity of feed in the unit. Refilling of the feed container may be done by specific schedule, corresponding to the amount of feed dispensed. The feed remains fresh and clean until it is dispensed onto the platform. The invention allows total control as to the amount of feed that is dispensed, thereby eliminating waste of contaminated or picked over feed.

The invention becomes a supplementary source of feed. As the unit operates and dispenses feed in programmable segments of time, fresh feed is easily provided for birds that feed at different times of the day. Accordingly, this also helps deter domineering birds from gaining control of the feeder and digging through the feed in search of favorite seed or morsels. Fresh feed is made continually available to feeding birds, and may be varied as to the amount dispensed in direct relation to the number of birds using the feeder. In addition, the use of this bird feeder will enable the user to exercise control of the amount of feed used.

The invention is constructed of components that are resistant to vandalous birds or animals that may use the feeder, thereby the failure of these components due to pecking, scratching, biting, gnawing, digging, chewing, or any other tenacious act will be minimal.

Although the description above contains many specifications, these should not be construed as limiting the scope of the invention but as merely providing illustrations of some of the presently preferred embodiments of the invention. For example, the bird feeder can be constructed in various shapes, sizes, and colors, and of various materials and components. In addition, adaptive procedures may be implemented to effect a feeder for other species of animals, including but not limited to pets and fish, without changing the scope of this specification.

I claim

1. A bird feeder comprising:
   a hollow, symmetrical, geometrically-shaped container of rigid material having a top opening and an aperture at the bottom;
   a cover located to cover said top opening of said container;
   a valve means for dispensing feed from said container comprising:
   an inlet;
   an outlet;
   a conveyor means to move feed from said inlet to said outlet;
   a motor means to actuate said conveyor;
   a timing means to alter operation sequence of said valve;
   a power source means to provide stored energy to operate said valve means and said timing means;
   a receptacle platform of rigid material to accommodate dispensed feed, said receptacle platform having an underside;
   a body of rigid material of sufficient size to enclose said container, power source means, and timing means;
   a frame of rigid material;
   a plurality of elongated support members;
   means of joining said elongated support members at right angles to the bottom of said frame and to the top of said receptacle platform at spaced locations so as to support said receptacle platform.

2. The bird feeder apparatus of claim 1 wherein said container has sloping sidewalls which extend down to said aperture at the bottom.

3. The bird feeder apparatus of claim 1 wherein said container is partitioned by a plurality of proportionately adjustable baffles.

4. The bird feeder apparatus of claim 1 further including an elongated support member and a means to attach said elongated support member to underside of said receptacle platform.

5. The bird feeder apparatus of claim 1 wherein said timing means is microprocessor controlled.

6. The bird feeder apparatus of claim 1 wherein said container, said cover, and said valve means are made of metal.

7. The bird feeder of claim 1 wherein a daylight sensing device is implemented to activate said timing means.

8. A bird feeder comprising: a hollow, symmetrical, geometrically-shaped container of rigid material having a feed filling opening and sloping sidewalls which extend down to a bottom aperture;
   a cover located to cover said feed filling opening;
   a valve means for dispensing feed from said container having an inlet, an outlet, a conveyor means to move feed from said inlet to said outlet, and a motor means to actuate said conveyor;
   a timing means to control operation sequence of said valve;
   a power source means to provide stored energy to operate said valve means and said timing means;
   a receptacle platform of rigid material to accommodate dispensed feed, said receptacle platform having an underside;
   a frame of rigid material;
   a body of rigid material of sufficient size to enclose said container, power source means, and timing means;
   a plurality of elongated support members;
   means of joining said elongated support members at right angles to the bottom of frame and to the top of said receptacle platform at spaced locations so as to support said receptacle platform;
   an elongated support member;
   means to attach said elongated support member to underside of said receptacle platform.

* * * * *